INVENTOR.
A. E. ODELL

ATTORNEYS 3,468,990
METHOD FOR FORMING A SUBSTANTIALLY WARP-FREE INTERIORLY FOAMED, THERMOPLASTIC ARTICLE
Allen E. Odell, Bartlesville, Okla., assignor to Phillips Petroleum Company, a corporation of Delaware
Filed Mar. 30, 1966, Ser. No. 538,558
Int. Cl. B29h 7/02
U.S. Cl. 264—45     5 Claims

ABSTRACT OF THE DISCLOSURE

A warp-free, foamed, thermoplastic article having a substantially nonporous outer skin and a foamed interior is formed by molding a foamable composition of the thermoplastic under foaming conditions, but under a pressure sufficient to prevent substantial foaming, and after a skin is formed around the molded thermoplastic, the molded thermoplastic is removed from the mold to allow foaming on the interior of the molded thermoplastic.

---

This invention relates to a method for making foamed articles.

Heretofore foamed articles have been produced by allowing the molded article to foam in the mold to prevent warping thereof. Further, most one-piece foamed articles have foamed structure extending to at least one surface thereof thereby requiring additional steps to render the article completely impervious.

It has now been found that substantially warp-free, foamed, thermoplastic articles having a continuous, substantially nonporous outer skin can be formed, simply, economically, and rapidly by molding a foamable composition of the thermoplastic under foaming conditions and under a pressure sufficient to prevent any substantial amount of foaming, carrying out this molding operation so that a self-sustaining skin is formed around the outer periphery of the article while foaming conditions are maintained in the interior of the article, and then reducing the pressure on the article to allow foaming on the interior of the article.

Accordingly, the article produced by this invention is a warp-free unitary thermoplastic article having a continuous inner core of foamed thermoplastic that is integral and coextensive with an outer self-supporting skin of solidified, nonfoamed thermoplastic. Further, the skin of the article of this invention is unique in that at least part of the skin, depending upon the configuration of the article itself, has been oriented and thereby strengthened by stretching under the pressure caused by the foaming of the inner core of the article.

Accordingly, it is an object of this invention to provide a new and improved method for forming a foamed, nonporous article.

Figure 1:
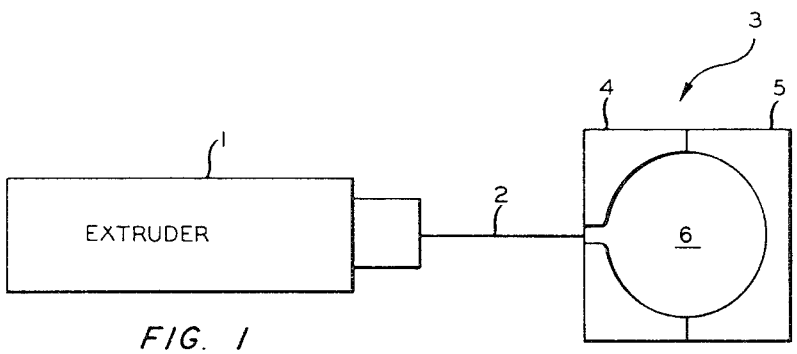
Figure 2:
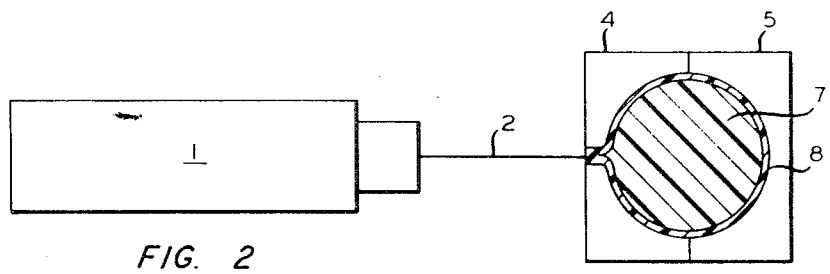
Figure 3:
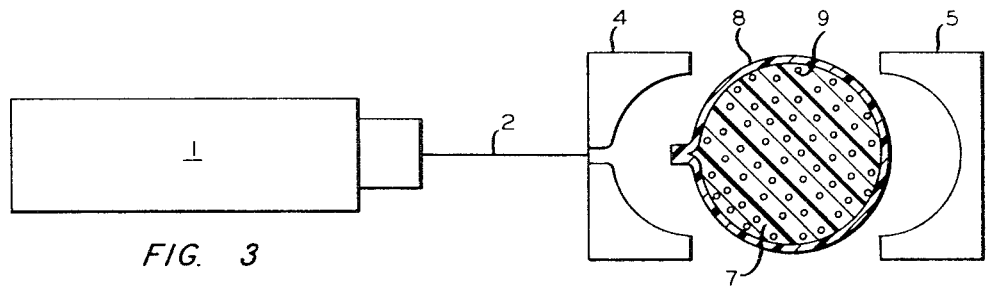

Other aspects, objects, and the several advantages of this invention will be apparent to those skilled in the art from the description, appended claims, and drawing in which FIGURES 1, 2 and 3 show schematically an extruder and mold in sequential stages of operation.

According to this invention any foamable, thermoplastic, be it a homopolymer, copolymer or two or more monomers, or mixtures of homopolymers and/or coplymers can be employed. Preferred polymers are polyolefins including homopolymers, copolymers, and mixtures thereof preferably formed from 1-olefins having from 2 to 8 carbon atoms per molecule, inclusive. Other suitable polymers include polyamides, polystyrene, polyvinyl chloride, and the like. Preferred polymers of 1-olefins include those formed from high and low density polyethylene, polypropylene, ethylene/butene-1 copolymers, and the like. These polymers are available commercially or their method of preparation as known to those skilled in the art.

Substantially any foaming agent known in the art can be employed. Generally, foaming agents used are those which liberate a gaseous material at a temperature in the range of from about 120 to about 700° F. Suitable foaming agents include ammonium carbonate, N,N'-dinitrosopentamethylenetetramine, sodium bicarbonate, azodicarbonamide, 4,4'-oxy-bis-(benzenesulfonyl hydrazide), azobisisobutyronitrile, benzene-1,3 - disulfonylhydrazide, diazoaminobenzene, barium azodicarboxylate, and the like. Liquid and/or gaseous and/or solid foaming agents are applicable to this invention. That class of foaming agents represented by azodicarbonamide are preferably used in screw injection molding machines where higher operation temperatures are employed. That class of foaming agents represented by ammonium carbonate are preferably employed in plunger injection molding machines where lower operating temperatures are normal. The amount of foaming agent employed can vary widely depending upon the polymer used and other conditions but will generally be in the range of from about 0.1 to about 5, preferably from about 0.2 to about 2, parts based on 100 parts by weight of the polymer.

Generally, any conventional temperature control agent and any known dispersing agent can be employed together with the foaming agents of this invention. Temperature control agents, both promoters and retarders, used to vary the temperature which the foaming agent or agents decompose can be employed and include zinc oxide, barium stearate, magnesium oxide, and the like, in amounts of from about 0.2 to about 4 parts per part of foaming agent employed. Other temperature control agents include aluminum laurate, barium ricinoleate, cadmium amyl phosphide, metal salts of fatty acids, and the like. Dispersing agents include mineral oil, dioctylphthalate, liquid polyisobutylene, and the like, and can be employed in amounts of from about 0.1 to about 1 part per 100 parts of polymer employed.

Of course, mixtures of two or more foaming agents, temperature control agents, dispersing agents, and the like can be used.

Also, various conventional additives such as antioxidants, stabilizers, antistatic agents, vulcanizing agents, pigments, and the like can be employed.

Any conventional method of incorporating foaming agents in the polymer can be employed, for example, powdered blowing agent can be dry blended with polymer pellets with or without the use of dispersing agents, preferably without. Also, concentrates of blowing agents and polymer can be made by melt blending the two at low temperatures so that activation of the foaming agent does not occur, cooling the melt blend to solidify same and comminuting the solidified blend. The concentrate can then be diluted with additional polymer not containing a foaming agent by conventional dry or melt blending techniques. During these blending procedures any desired additive such as temperature control agents, dispersants, and the like can also be employed.

The foaming agent-containing polymer can be molded in any manner which allows the maintenance of the molded product under an elevated pressure, while cooling a skin portion thereof. Generally, the molding pressure should be that which prevents any substantial amount of foaming of the polymer and will generally be at least 50 p.s.i.g., a maximum pressure depending only on the capability of the equipment used. The temperature of the mold, including the walls which come in contact with the molded article, should be that which is sufficient to solidify the particular polymer from which the article is made, the maximum temperature being just below, e.g. 3° F., the freezing point of the polymer itself. The temperature in the mold can be at room temperature or above or below same depending upon the length of time it is desired to keep the article in the mold, the cooler the mold the shorter the time of residence of the article therein. The residence time of the article in the mold should be that which is sufficient to solidify a skin only without decreasing the temperature of the polymer on the interior of the article below the solidification point of the polymer so that when the polymer is removed from the mold or the pressure otherwise reduced thereon foaming in the interior of the article inherently takes place. The residence time will vary widely depending upon the type of polymer, skin thickness of the article desired, and the like but will generally be in the range of from about 15 seconds to about 1 minute. However, residence times substantially less than 15 seconds and substantially greater than 1 minute are quite feasible. In general the residence time should be that which is sufficient to allow the skin on each exposed surface of the article to solidify to a thickness of at least 10 percent of the total thickness of the article at the point where the skin is measured. Preferably, the skin thickness will be from about 15 to about 25 percent of the total thickness of the article at the point where the skin is measured. Thus, if the article is a bucket, the inner and outer vertical walls of the bucket will each have a skin and the thickness of each skin, i.e. on the inner and outer walls, will be at least 10 percent based upon the cross sectional thickness of the entire bucket wall, including both skins.

In FIGURE 1 is shown an extruder which is joined by a conduit 2 to mold 3 composed of mold halves 4 and 5, the interior of the mold halves defining a mold cavity 6. In FIGURE 2 the apparatus described in FIGURE 1 is shown with the mold cavity filled with foamable polymer from extruder 1. The molded polymer 7 has a skin 8 about the periphery thereof in contact with the surfaces of mold halves 4 and 5. In FIGURE 3, the molded polymer has been removed from the confines of mold halves 4 and 5, thereby allowing foaming of the interior 7 of the polymer to take place, forming individual bubbles 9 in the interior of the article, but still surrounded by outer, non-foamed skin 8.

The articles produced by this invention have an extremely wide variety of uses and generally are applicable to any light-weight, nonporous article capable of being molded under pressure as well as any insulated article. For example, articles that can be readily produced by this invention include conventional buckets and similar containers, water coolers, ice bucket and containers, picnic chests, refrigerator liners, bottle cases, underwater insulation panels, and the like. In general the type of polymer employed will vary with the end use of the article from which the polymer is made. For instance, polyethylene having a density of about 0.96 gram per cubic centimeter at 25° C. and a melt index of 0.9 (ASTM D–62T, Condition E) would be used for those articles which will be submitted to very rugged conditions which require a tough, strong article. It should be noted that because of the interior foaming aspect of this invention, an article made from such high density polyethylene will not have a similar high density but rather the density of the article overall will be lowered, for example to the area of about 0.85 gram per cubic centimeter or lower at 25° C. With a polyethylene having a density of about 0.95 gram per cubic centimeter at 25° C. and a melt index of 9.5 an article made therefrom by this invention can have an overall density of about 0.3 gram per cubic centimeter at 25° C.

The reduction of the pressure on the molded article to cause foaming of the interior thereof can be carried out in any manner from simply reducing the pressure in the mold on the article to a point below that which prevents substantial foaming of the polymer or, more simply and more preferably, simply removing the article from the mold and subjecting same to ambient atmospheric pressures. Generally, no reheating of the molded article is necessary, although this can be practiced if desired, since the solidified skin around the periphery of the article will tend to maintain the interior in a heated condition which is sufficient to cause foaming of the poylmer when the pressure on the molded article is reduced.

The article thus formed is unitary and has a foamed inner core which is integral over substantially its complete surface with the outer self-supporting skin of the article which is nonfoamed and therefore relatively nonporous compared to the foamed interior. Further, the skin of the article will at least in part be much stronger than conventional skin that is merely solidified by cooling because upon foaming of the interior of the article substantial pressures are generated which tend to stretch the outer skin therefore orienting and strengthening same in a known manner. The amount of skin of any given article that is in fact oriented under the foaming pressures generated by the foaming of the interior thereof will vary widely depending upon the configuration of the article and can vary from part of the skin to substantially all of the skin. However, because of this orienting of at least part of the skin the overall article is strengthened and made even tougher than it would be if it had just been solidified without any orientation of any part thereof.

EXAMPLE

A 2 gallon bucket having a substantially nonfoamed surface over all exposed sides thereof and a substantially foamed interior was made by dry blending a homopolymer of ethylene having a density of 0.96 gram per cubic centimeter at 25° C. (ASTM D–1505–62T) and a melt index of 0.9 (ASTM D–62T, Condition E) with 0.5 weight percent azodicarbonamide based upon the total weight of the polymer.

The foamable polymer composition was then used in a 35 ounce Napco screw injection molding machine using a cylinder temperature of 450° F. and an injection pressure of 14,000 p.s.i.g. The bucket mold temperature was 70° F. and the molded article was maintained in the mold under pressure of about 14,000 p.s.i.g. for about 40 seconds.

After the 40 seconds residence time the mold was opened and the molded article subjected to ambient atmospheric pressure to allow foaming of the core. The skin thickness of the bucket was about 18 percent of the total thickness of the bucket sides and the bucket itself had an overall density of 0.5 gram per cubic centimeter at 25° C. (ASTM D1505–60T). The bucket was surprisingly sturdy in view of its light weight and no indication of warpage was found anywhere after a careful visual examination thereof.

I claim:

1. A method for forming a substantially warp-free, interiorly foamed, thermoplastic article having a substantially nonfoamed outer skin comprising molding a foamable composition of said thermoplastic under foaming conditions but also under a pressure sufficient to prevent any substantial amount of foaming in said thermoplastic, maintaining said foamable plastic in the molded condition for a time and maintaining said mold at a temperature wherein both are sufficient to cause solidification of a self-supporting skin of from about 15 to about 25 percent of the total thickness of the article at the point where the skin thickness is measured on all surfaces of said molded foamable plastic without reducing the foaming conditions on the interior of said molded, foamable plastic, and then removing said molded, foamable plastic from the mold and subjecting same to ambient atmospheric pressures to reduce the pressure on said molded foamable plastic to a pressure where the internal nonsolidified portion of said molded foamable plastic foams to a substantial degree.

2. The method according to claim 1 wherein said thermoplastic is at least one of homopolymers and copolymers of 1-olefins containing from 2 to 8 carbon atoms per molecule, polystyrene, polyvinyl chloride, and mixtures thereof, said thermoplastic is rendered foamable by incorporating therein from about 0.1 to about 5 weight percent based upon the total weight of the thermoplastic of at least one foaming agent which liberates a gaseous material at a temperature in the range of from about 300 to about 700° F.

3. The method according to claim 1 wherein the molding pressure is at least 50 p.s.i.g. the molding temperature is that which is sufficient to solidify the particular thermoplastic being molded, the residence time of the thermoplastic in the mold being that which is sufficient to solidify only a portion of the molded thermoplastic at the particular molding temperature, and the skin thickness for the molded article is at least 10 percent of the total thickness of the article at the point where the skin thickness is measured.

4. The method according to claim 1 wherein said thermoplastic is polyethylene, the foaming agent is azodicarbonamide present in the polyethylene in the amount of from about 0.2 to about 2 weight percent based upon the total weight of the polyethylene, the molding pressure is at least 50 p.s.i.g. and the temperature of the molding surfaces is about room temperature.

5. The method according to claim 1 wherein said thermoplastic is polypropylene, the foaming agent is azodicarbonamide present in the polypropylene in the amount of from about 0.2 to about 2 weight percent based upon the total weight of the polyethylene, the molding pressure is at least 50 p.s.i.g., and the temperature of the molding surfaces is about room temperature.

References Cited

UNITED STATES PATENTS

| | | | |
|---|---|---|---|
| 2,283,316 | 5/1942 | Cooper et al. | 264—55 |
| 3,341,043 | 9/1967 | Santelli | 264—48 |
| 2,825,721 | 3/1958 | Hogan et al. | |
| 3,058,161 | 10/1962 | Beyer et al. | 264—47 |
| 3,200,176 | 8/1965 | Baxter | 264—54 |
| 3,211,605 | 10/1965 | Spaak et al. | 264—321 XR |
| 3,218,375 | 11/1965 | Hardwick | 264—48 XR |
| 3,268,636 | 8/1966 | Angell | 264—48 XR |
| 3,306,960 | 2/1967 | Weissman et al. | 264—48 XR |

PHILIP E. ANDERSON, Primary Examiner

U.S. Cl. X.R.

264—48, 50, 51, 55, 288, 328